(12) United States Patent
Gersemsky et al.

(10) Patent No.: US 6,460,828 B1
(45) Date of Patent: Oct. 8, 2002

(54) BRAKE, IN PARTICULAR FOR A DRIVE OF A HOIST

(75) Inventors: Udo Gersemsky, Herdecke; Heinz Flaig, Bochum; Jürgen Heun, Dortmund; Franz Schulte, Herdecke; Rüdiger Ostholt, Wetter, all of (DE)

(73) Assignee: Demag Cranes & Components GmbH, Wetter (DE)

( * ) Notice: Subject to any disclaimer, the term of this patent is extended or adjusted under 35 U.S.C. 154(b) by 0 days.

(21) Appl. No.: 09/539,503

(22) Filed: Mar. 30, 2000

(30) Foreign Application Priority Data

Apr. 1, 1999 (DE) .......................................... 199 16 413

(51) Int. Cl.$^7$ ................................................. B66D 1/48
(52) U.S. Cl. ......................... 254/267; 188/164; 188/180
(58) Field of Search ................... 188/155, 158, 188/159, 161, 164, 180; 254/343, 375, 267

(56) References Cited

U.S. PATENT DOCUMENTS

| | | | | |
|---|---|---|---|---|
| 3,778,005 A | * | 12/1973 | Gruniger et al. | 242/186 |
| 3,876,183 A | * | 4/1975 | Strout et al. | 254/175.7 |
| 3,965,404 A | * | 6/1976 | Petersen | 318/261 |
| 4,224,545 A | * | 9/1980 | Powell | 310/93 |
| 4,327,873 A | * | 5/1982 | Juppet et al. | 242/45 |
| 4,625,946 A | * | 12/1986 | Clark, Jr. et al. | 254/274 |
| 4,958,805 A | * | 9/1990 | Willamsson | 254/332 |
| 5,145,480 A | * | 9/1992 | Wang | 482/63 |
| 5,195,618 A | * | 3/1993 | Wu | 188/164 |
| 5,671,912 A | * | 9/1997 | Langford | 254/267 |
| 6,062,350 A | * | 5/2000 | Spieldiener et al. | 188/161 |

FOREIGN PATENT DOCUMENTS

| | | |
|---|---|---|
| DE | 681 589 | 9/1939 |
| DE | 2101 300 A | 7/1972 |
| DE | 94 21 601 U1 | 7/1996 |
| EP | 0 094 109 A1 | 11/1983 |

* cited by examiner

Primary Examiner—Paul N. Dickson
Assistant Examiner—Bradley King
(74) Attorney, Agent, or Firm—Henry M. Feiereisen

(57) ABSTRACT

A brake for a hoist, includes a brake disk and a magnetic filed which is aligned transversely to the brake disk and generates a reactive force which inhibits a movement of the brake disk and is dependent on the rotation speed of the brake disk as well as a radial distance from the rotation axis. The magnetic field is formed by two magnetic poles arranged on both sides of the brake disk. A cost-efficient, compact and wear-resistant brake which operates in dependence on the rotation direction and is applicable in particular for a drive of a hoist, with the drive including a motor without generator-produced torque and/or with greatly load-dependent rotational speed, and a self-locking gear mechanism, can be implemented in such a manner that both magnetic poles are movable by the reactive force along a predetermined path from a rest position in opposition to a return force of an elastic member in rotation direction, wherein the radial distance is preset during movement along the path by a desired course of the rotation direction dependent and rotational speed dependent braking force and adjustable by the return force of the elastic member.

7 Claims, 3 Drawing Sheets

BRAKE, IN PARTICULAR FOR A DRIVE OF A HOIST

CROSS-REFERENCES TO RELATED APPLICATIONS

This application claims the priority of German Patent Application, Serial No. 199 16 413.4, filed Apr. 1, 1999, the subject matter of which is incorporated herein by reference.

BACKGROUND OF THE INVENTION

The present invention relates to a brake. The present invention further relates to a hoist having incorporated such a brake.

It is generally known, especially in typical electricity meters, to generate for speed-dependent braking action a corresponding countertorque by means of an electrically conductive flat brake disk and a magnetic field which is produced by a horseshoe-shaped permanent magnet and oriented transversely to the brake disk. The magnetic field acts on a portion of the brake disk, whereby the brake disk moves through an air gap of the U-shaped permanent magnet. This leads in the brake disk to an inducement of a current which is approximately proportional to the rotational speed whereby the current circuit is closed across the portion of the brake disk that is not located in the magnetic field. The current flow generates an opposing magnetic field and, as a consequence of the resultant magnetic forces, the countertorque, to thereby effect a deceleration of the brake disk. The countertorque is dependent on the mean radial distance of the magnetic field from the rotation axis of the brake disk since the portion of the brake disk, penetrated by the magnetic field, moves, at constant rotational speed of the brake disk, through the magnetic field at growing radius and increasing velocity.

It is further known to provide drives for hoists for lifting and lowering loads with a squirrel-cage type induction motor as power driven and generator torque producing electric motor (so-called four-quadrant motor), and in addition with a brake, in particular to effect a delay and to hold a load. The rotational speed of squirrel-cage type induction motors is independent from the rotation direction of the brake disk and from the load, and generates by itself a desired braking torque when the load is lowered, i.e. when the load drives the motor. Typically, electromagnetic brakes or friction disk brakes are utilized as mechanical brakes.

SUMMARY OF THE INVENTION

It is an object of the present invention to provide an improved rotation-direction dependent brake which is cost-efficient, compact and wear-resistant.

It is another object of the present invention to provide an improved brake, which is applicable for a drive of a hoist, in particular for a drive having a motor, e.g. a cost-efficient universal motor, which does not produce a generator torque and/or runs at a highly load-dependent rotational speed as well as includes a self-locking gear mechanism.

These objects, and others which will become apparent hereinafter, are attained in accordance with the present invention by providing an electrically conducting brake disk rotating about a rotation axis; two magnetic poles positioned on both sides of the brake disk and defining a magnetic north and a magnetic south, for establishing a magnetic field directed transversely to the brake disk and acting, at least temporarily, on a portion of the brake disk, wherein the magnetic field has an orientation which depends on a rotation direction of the brake disk and generates a reactive force which retards the movement of the brake disk and is dependent from the rotation speed of the brake disk as well as from a radial distance from the rotation axis, wherein the magnetic poles are movable by the reactive force, in opposition to a return force applied by an elastic member, from a rest position along a predetermined path in rotation direction of the brake disk, wherein the radial distance is preset during movement along the path by a desired course of the rotation direction dependent and rotational speed dependent braking force and adjustable by the return force of the elastic member.

A brake according to the present invention is configured as eddy-current brake which is especially suitable for a rotary drive in the form of a dc motor or ac motor, without producing a generator torque and with highly load-dependent rotational speed, i.e. universal motors. In conjunction in particular with hoists, the use of such inexpensive universal motors is problematic because as a consequence of the lacking generator torque, universal motors cannot be decelerated in the normally simple way. Moreover, operation of universal motors is greatly dependent on the load and the rotational speed. When not subject to a load, universal motors exhibit a tendency to easily "overspin", i.e. the rotational speed increases significantly. For that reason, universal motors should always run with a load. Moreover, the braking action should be dependent on the rotational speed, when used in hoists because a braking moment is only required during lowering of a load. Therefore, in accordance with the present invention, the magnetic poles are initially in a rest position. Only when the brake disk revolves will the magnetic poles move along the predetermined path as defined by a constraining guidance. The movement along this path is carried out in opposition to the return force applied by the elastic member, whereby the radial distance of the magnetic poles from the rotation axis of the brake disk varies during movement of the magnetic poles along the path. For example, the radial distance may steadily increase in proportional relation to the rotational speed of the brake disk, with the extent of the increase in both rotation directions being of different magnitude. During lifting, the braking moment of the brake disk can thus be set much smaller.

Suitably, the elastic member may be configured as a helical spring which automatically adjusts the predetermined radial distance with its spring tension according to the spring characteristic. This represents a simple solution and requires merely a selection of a helical spring of desired spring characteristic.

According to one aspect of the present invention, both magnetic poles may be located on a U-shaped permanent magnet.

According to another aspect of the present invention, the constraining guidance for conducting the magnetic poles along the predetermined path can be implemented by locating both magnetic poles on a free end of a swivel member which embraces the brake disk in a U-shaped manner and swings about a pivot axis extending in parallel relation to the rotation axis. Suitably, the swivel member swings at a pivot angle which is limited by a stop member. Thus, during swinging from a predetermined rotation speed, the greatest possible braking moment may be effective, with the magnetic poles positioned at a location of relatively great radial distance from the rotation axis.

The brake characteristic of the eddy-current brake can be configured for directional dependency by providing a second magnetic field which is aligned in a direction transversely to the brake disk and formed by further two magnetic poles. The provision of this second magnetic field is effective only in one rotation direction, i.e. in the event of a hoist only in the rotation direction that implements a lowering of a load.

According to another feature of the present invention, the swivel member includes two arms, with the magnetic poles of the two magnetic fields being located, respectively, on the free ends of both arms of the swivel member. A simplification can be realized when the second magnetic field acts only in one rotation direction of the brake disk and is located outside the brake disk when the brake disk rotates in the other rotation direction.

It is still another object of the present invention to provide an improved hoist which includes a simple brake.

This object is attained in accordance with the present invention by providing a lifting mechanism, which includes an electric motor configured as a dc motor or ac motor, which does not produce a generator torque and/or has a highly load-dependent rotation speed, and with a brake mechanism which is comprised of a self-locking gear mechanism, e.g. a worm gear, and an eddy-current brake. The eddy-current brake supports the gear mechanism which does not apply a braking action in the upper rotational speed range. At standstill, the statically self-locking gear mechanism solely provides the braking and holding functions.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
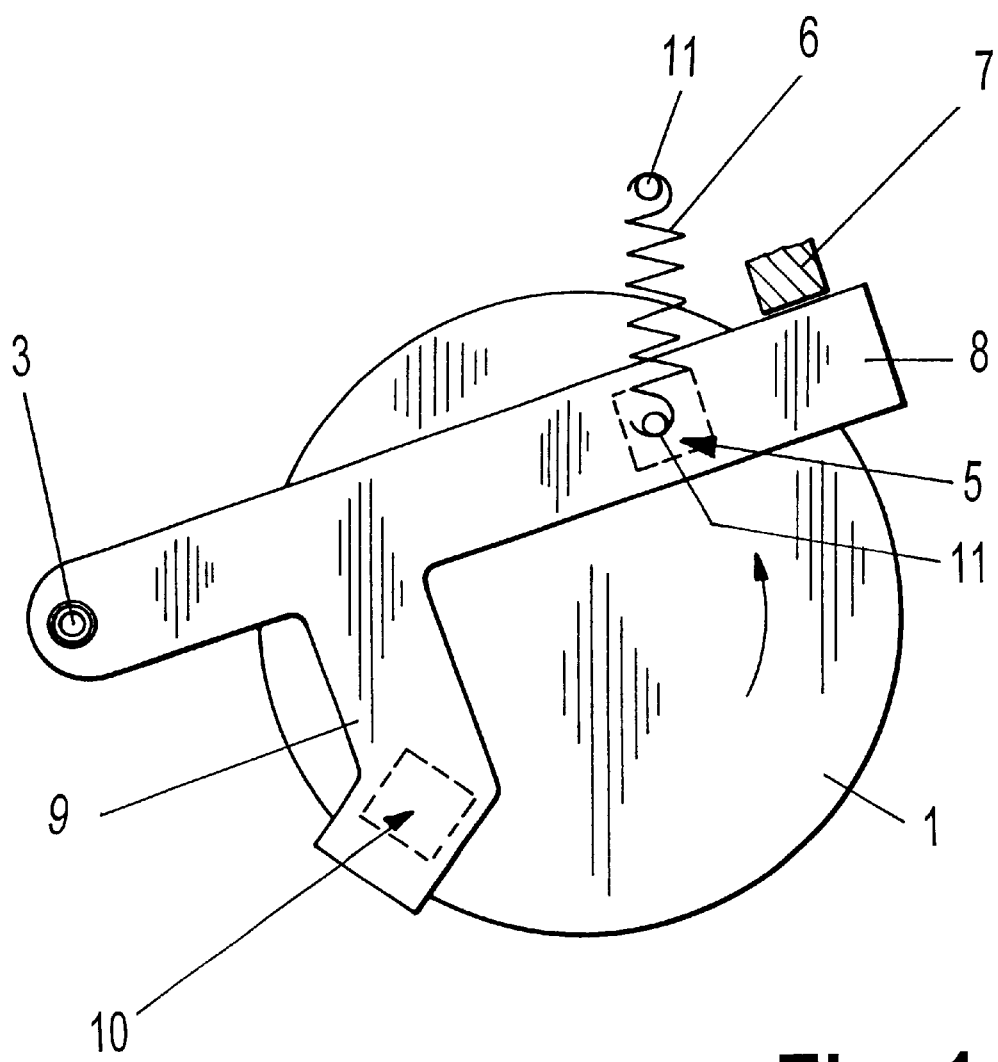
FIG. 1 is a simplified illustration of an eddy-current brake according to the present invention, for use with a hoist, with the brake shown in a position for lowering a load.

Throughout all the Figures, same or corresponding elements are generally indicated by same reference numerals.

Figure 4:
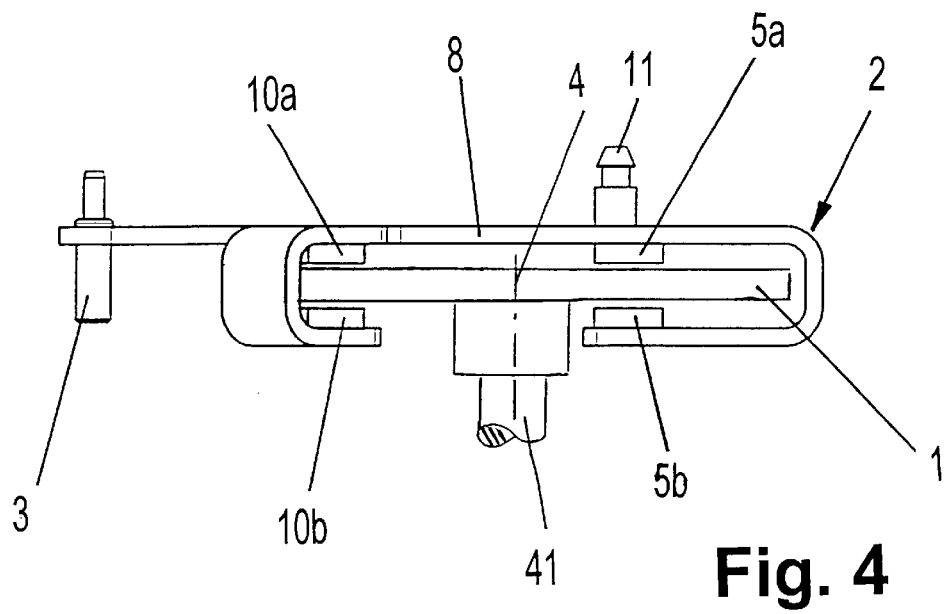
FIG. 4 is a plan view of the eddy-current brake of FIG. 1.

Turning now to the drawing, and in particular to FIG. 1, there is shown a simplified illustration of an eddy-current brake according to the present invention, including a flat circular disk which is made of an electrically conducting material, e.g. aluminum, and serves as a brake disk 1. The brake disk 1 is driven by an electric motor 1a (FIG. 5), which is configured as universal motor, for rotation about a rotation axis 4. The eddy-current brake further includes a swivel member 2 which is rotatable about a pivot axis 3 extending parallel to the rotation axis 4. The swivel member 2 embraces the brake disk 1 in a U-shaped manner, as best seen in FIG. 4, thereby defining two parallel legs which have located thereon two magnetic poles 5 arranged in spaced-apart relationship at formation of an air gap, and forming a magnetic north 5a and a magnetic south 5b in confronting disposition. Both magnetic poles 5 generate a magnetic field which is oriented transversely to the brake disk 1 and passes through the brake disk 1 locally in the area of the magnetic poles 5.

When the brake disk 1 revolves, an electric current is induced in the brake disk 1 in the area of the magnetic poles 5, with the electric current being directed radially and closing across those portions of the brake disk 1 which are not located in the magnetic field. This current in turn generates an opposing magnetic field which generates a reactive force and counteracts its cause, which means that the rotational movement of the brake disk 1 is retarded. The strength of the opposing magnetic field depends on the rotational speed of the brake disk 1 as well as on the radial distance of the magnetic poles 5 from the rotation axis 4 of the brake disk 1, and the orientation of the opposing magnetic field is determined by the rotation direction of the brake disk 1. The opposing magnetic field swings hereby the swivel member 2 with the magnetic poles 5 about the pivot axis 3.

The swivel member 2 forms a constraining guidance, i.e. the swivel member 2 describes about the pivot axis 3 an arc of a circle for defining a predetermined path for the magnetic poles 5 to move across the brake disk 1. During movement across the brake disk 1, the radial distance of both magnetic poles 5 from the rotation axis 4 of the brake disk 1 varies.

As further shown in FIG. 1, the swivel member 2 is acted upon by an elastic element in the form of a helical spring 6 which is secured on both its ends on respective pins 11 and applies a return force that resists a movement of the magnetic poles 5 from their rest position as a result of the induced opposing magnetic field. The rest position is not shown in the drawing and represents the position of the swivel member 2 when the brake disk 1 is at a standstill. Although not shown in the drawing, it is certainly conceivable to replace a single helical spring 6 with two such helical springs, located on each side of the swivel member 2, with the effective characteristic curve being established through superimposition of both individual characteristic curves of these helical springs.

The swivel member 2 further interacts with a stop member 7 by which the pivot angle of the swivel member 2 is so restricted on one side that the radial distance of the magnetic poles 5 from the rotation axis 4 assumes a greatest possible value.

As shown in FIG. 1, the swivel member 2 is configured as two-armed lever, having a long arm 8 and a short arm 9 which extends perpendicular to the arm 8. The radial distance between the point of attachment of the arm 9 to the arm 8 and the pivot axis 3 is significantly shorter than the radial distance of the magnetic poles 5 from the pivot axis 3. The short arm 9 has a free end for supporting a further pair of magnetic poles 10 which define a magnetic north 10a and a magnetic south 10b in a same manner as the magnetic poles 5 on the arm 8.

Figure 2:
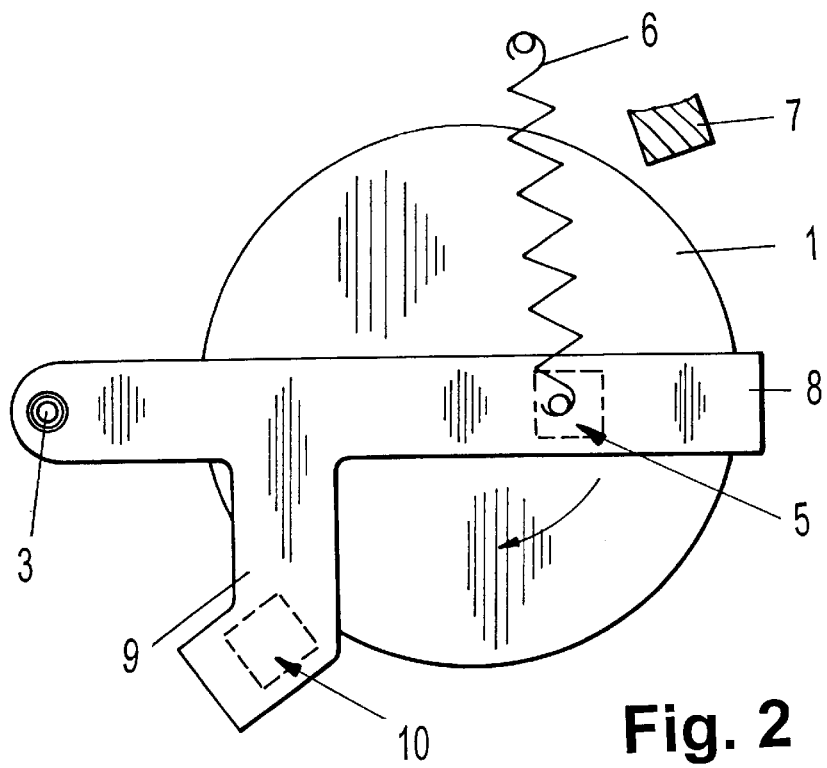
FIG. 2 is a simplified illustration of the eddy-current brake of FIG. 1, showing the brake in a position for lifting at full load or nominal load.
Figure 3:
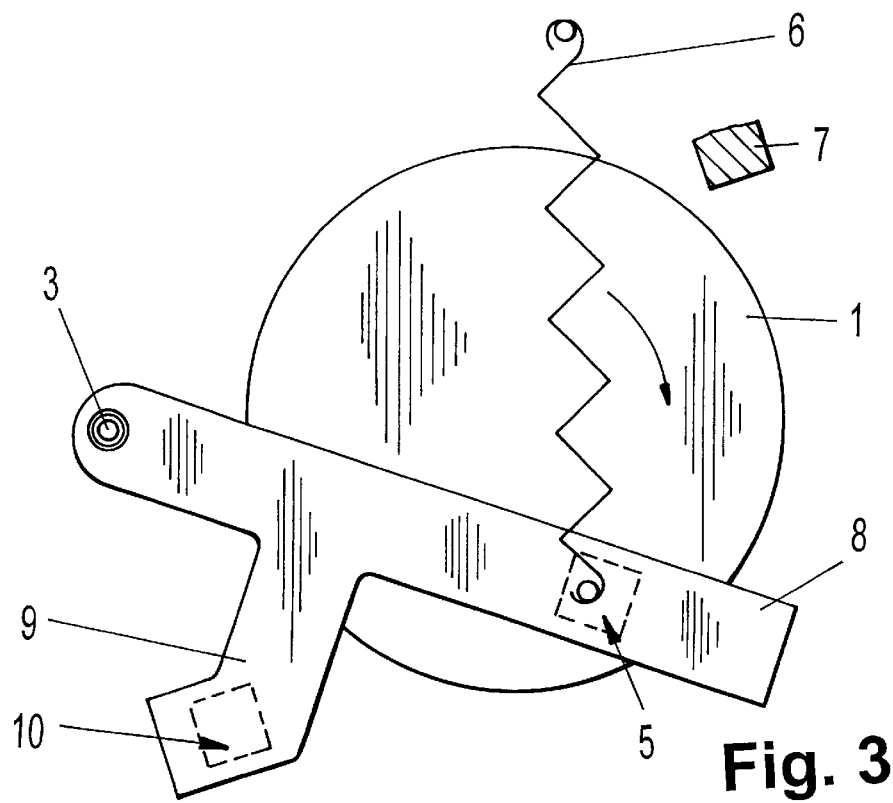
FIG. 3 is a simplified illustration of the eddy-current brake of FIG. 1, showing the brake in a position for lifting with no load.

The entire magnetic field of both magnetic poles 10 acts in FIG. 1 fully on the brake disk 1 as a load (not shown) is lowered, whereas in FIGS. 2 and 3, the magnetic poles 10 are located outside the brake disk 1 and therefore cannot apply a braking action during lifting of a load. The two-armed swivel member 2 thus realizes in a simple manner a greater braking action in one rotation direction. In FIGS. 2 and 3, the swivel member 2 is shown in two dispositions in the opposite rotation direction and at two different rotational speeds, with the rotational speed in FIG. 2 being smaller than the rotational speed of the brake disk 1 in FIG. 3, and thus application of a respectively smaller braking action.

FIG. 4 shows a plan view of the eddy-current brake of FIG. 1. For sake of simplicity, the electromotor 1a is shown here only by way of its motor shaft 41 which is operatively connected to the brake disk 1.

Figure 5:
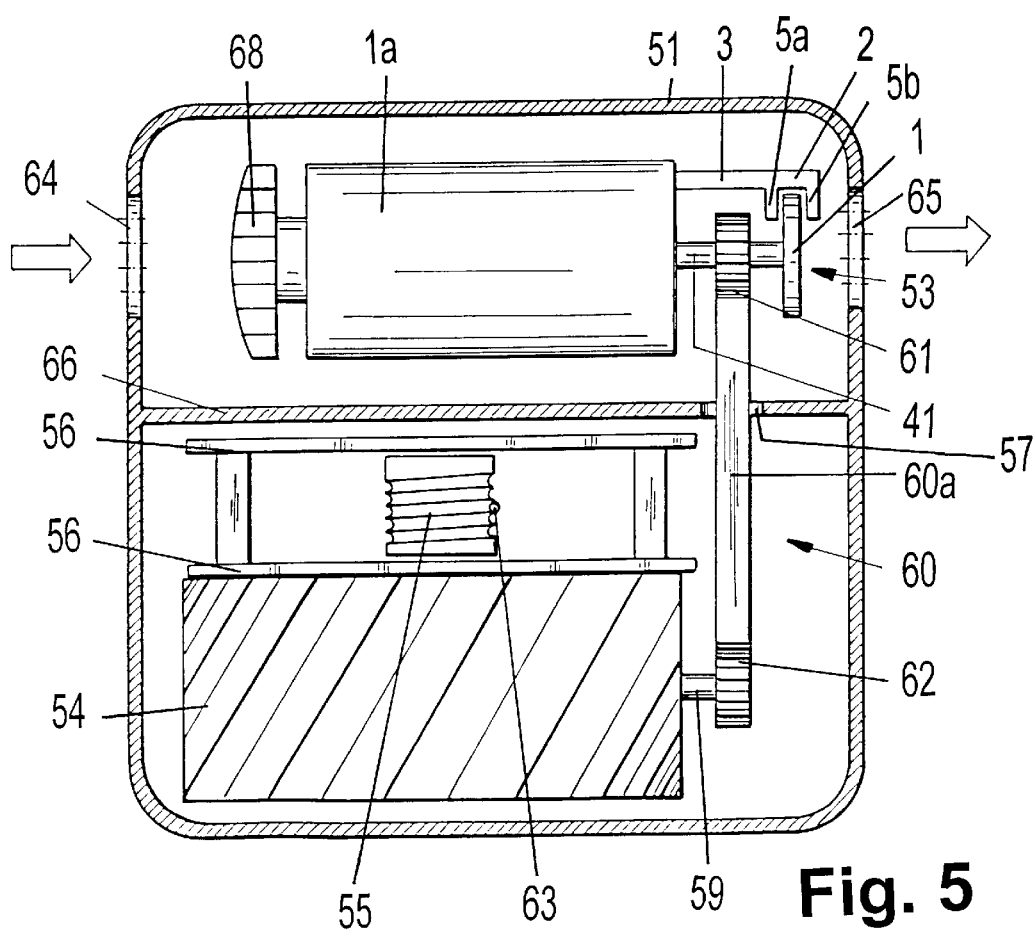
FIG. 5 is a partially sectional view of a hoist having integrated therein an eddy-current brake of FIG. 1.

Turning now to FIG. 5, there is shown a partially sectional view from above of a hoist having integrated therein the eddy-current brake of FIG. 1, generally designated here by reference numeral 53. For the sake of simplicity, the eddy-current brake will be described in the context of FIG. 5 only in connection with those parts that are necessary for the understanding of the present invention. Parts of the eddy-current brake corresponding with those in FIG. 1 are denoted by identical reference numerals and not explained again.

The hoist has a block-shaped housing 51 which accommodates in a common plane the electric motor 1a in the form of a universal motor which can be operated with DC and AC, the eddy-current brake 53, a self-locking worm gear 54 having a rotary shaft 59, and a traction drive 55 which may be configured as rope drive or chain drive. The motor shaft 41 extends in parallel relation to the rotary shaft 59 of the worm gear 54 and is operatively connected with the rotary shaft 59 via a belt drive 60 having a belt 60a which is trained over a drive pulley 61 in the form of a gear, and a driven gear 62. The pulley 61 is mounted on the output side to the motor shaft 41 and the driven gear 62 is mounted to the rotary shaft 59 of the worm gear 54. The traction drive 55 is driven directly by the worm gear 54 and secured within a carrier frame 56 between the electric motor 1a and the worm gear 54. As further shown in FIG. 5, the traction drive 55 rotates about a rotation axis which is oriented perpendicular to the rotary shaft 59 of the worm gear 54, and has a roller or drum for a traction member 63 which is guided to the outside via a suitable opening (not shown) in the housing 51.

The housing 51 has an inlet opening 64 and an outlet opening 65 for circulation of cooling air, as indicated by the arrows in FIG. 5, by means of a fan 68 mounted on the output-distal end of the motor shaft 41. A partition wall 66 subdivides the interior of the housing 51 into a compartment that includes the electric motor 1a and is cooled by the circulating air, and an adjacent compartment in which the worm drive 54 and the traction drive 55 are located. Only a small opening 57 for the passage of the belt 60a is provided in the partition wall 66. The fan 68 draws cooling air through the inlet opening 64 and forces air through the housing compartment being cooled in a direction longitudinally of the motor shaft 41. Thus, cooling air cools the electric motor 1a as well as the brake disk 1 during operation of the motor. The brake disk 1 is arranged anteriorly of the outlet opening 15 so that cooling air necessarily flows across the brake disk 1.

The worm drive 54 has a static self-locking action which is so adjusted that the worm drive 54 is capable to hold even a greatest load when the electric motor 1a is at a standstill. The braking action is at a maximum at small rotational speed and decreases with increasing rotational speed of the worm. Through combination of the self-locking worm gear 54 with the eddy-current brake 53, a desired speed-dependent and rotation-direction-dependent braking torque can be established in a simple manner and at a fairly wide adjustment range, including the rotational speed zero.

The configuration of the electric motor 1a in the form of a very inexpensive universal motor is advantageous. The universal motor 1a includes a stator winding and a rotor winding and does not produce a generator torque and can therefore not be braked by the generator torque. The windings are connected in series, and can be operated with DC and AC. The rotational speed behavior of the universal motor 1a is highly load-dependent. This characteristic can be reduced to an acceptable level through the integration of the eddy-current brake 53. The hoist is hereby operated by means of the eddy-current brake 53 and the worm gear 54 at a base load torque so that the universal motor 1a runs stable when no load is applied despite its tendency under these conditions to overspin. This means that the eddy-current brake 53 assumes in a hoist in conjunction with the self-locking gear mechanism, preferably a worm gear 54, the braking function, with the eddy-current brake 53 supporting the worm gear 54 in the higher rotational speed range when the braking action of the worm gear 54 weakens or is ineffective altogether. At standstill, the static self-locking worm gear 54 solely applies the braking action.

While the invention has been illustrated and described as embodied in a brake, in particular for a drive of a hoist, it is not intended to be limited to the details shown since various modifications and structural changes may be made without departing in any way from the spirit of the present invention.

What is claimed is:

1. A hoist, comprising
   a motor driven lifting mechanism; and
   a brake including
      an electrically conducting brake disk rotating about a rotation axis;
      magnetic means including a first pair of magnetic poles, positioned on both sides of the brake disk and defining a magnetic north and a magnetic south, for establishing a first magnetic field directed transversely to the brake disk and acting, at least temporarily, on a portion of the brake disk, said magnetic field having an orientation which depends on a rotation direction of the brake disk and generating a reactive force which retards the movement of the brake disk and is dependent on the rotation speed of the brake disk as well as a radial distance from the rotation axis;
      a constraining mechanism for guiding the magnetic poles along a predetermined path; and
      an elastic member, said magnetic poles being movable by the reactive force, in opposition to a return force applied by the elastic member, from a rest position along the predetermined path in rotation direction of the brake disk, wherein the radial distance is preset during movement along the path by a desired course of the rotation direction dependent and rotational speed dependent braking force and adjustable by the return force of the elastic member,
      wherein the constraining mechanism includes a swivel member which is configured to swing about a pivot axis, oriented in parallel relation to the rotation axis, and to sweep over the rotation axis, wherein the swivel member extends across one side of the brake disk and terminates in a U-shaped portion which embraces the brake disk,
      wherein the magnetic poles of the first pair of magnetic poles is located on the U-shaped portion of the swivel member in confronting relationship on either side of the brake disk.

2. The hoist of claim 1, wherein the elastic member is a spring applying a spring force which automatically adjusts the predetermined radial distance in correspondence to its spring characteristic.

3. The hoist of claim 1, wherein the swivel member swings at a pivot angle, and further comprising a stop member for limiting the pivot angle.

4. The hoist of claim 1, wherein the magnetic means includes a second pair of magnetic poles for generating a second magnetic field which is aligned in a direction transversely to the brake disk.

5. The hoist of claim 4, wherein the swivel member has two arms, wherein the U-shaped portion forms part of one of the arms, wherein the other one of the arms terminates in a U-shaped portion, wherein the magnetic poles of the second pair of magnetic- poles are located in confronting relationship on the U-shaped portion of the other one of the arms of the swivel member.

6. The hoist of claim 4, wherein the second pair of magnetic poles acts upon the brake disk only in one rotation direction and is located in the other rotation direction outside the brake disk.

7. The hoist of claim 1, wherein the lifting mechanism includes an universal motor.

* * * * *